United States Patent [19]

Gallagher, Sr.

[11] Patent Number: 5,688,135
[45] Date of Patent: Nov. 18, 1997

[54] CASE FOR A WIRE HARNESS HAVING COLOR-CODED CABLE ROUTING LINES ON ADHESIVE TAPE

[75] Inventor: Robert Eugene Gallagher, Sr., Harrisburg, Pa.

[73] Assignee: The Whitaker Corporation, Wilmington, Del.

[21] Appl. No.: 752,456

[22] Filed: Nov. 15, 1996

Related U.S. Application Data

[60] Provisional application No. 60/026,767 Sep. 26, 1996.
[51] Int. Cl.⁶ .................... H01R 9/03; H01R 9/11
[52] U.S. Cl. .................. 439/214; 174/72 C; 174/72 A
[58] Field of Search .................... 439/214, 215, 439/216; 174/650, 70 R, 71 R, 72 R, 72 A, 72 C, 112, 117 F; 156/293; 128/DIG. 26

[56] References Cited

U.S. PATENT DOCUMENTS 5,378,166  1/1995  Gallagher, Sr. .................. 439/214

FOREIGN PATENT DOCUMENTS

405115116 A  5/1993  Japan .................. 174/72 R

*Primary Examiner*—Hyung S. Sough
*Assistant Examiner*—Kamand Cuneo

[57] ABSTRACT

A case (12) combined with a cable assembly (14) having individual cables (22) terminated with connectors (16), a tape with adhesive on both sides of the tape (56), the tape (56) being in adhesive contact with an interior cavity of the case (12), cable routing lines on the tape (56), the cable routing lines (58) indicating the desired location for said cables (22) along the interior cavity (34).

6 Claims, 4 Drawing Sheets

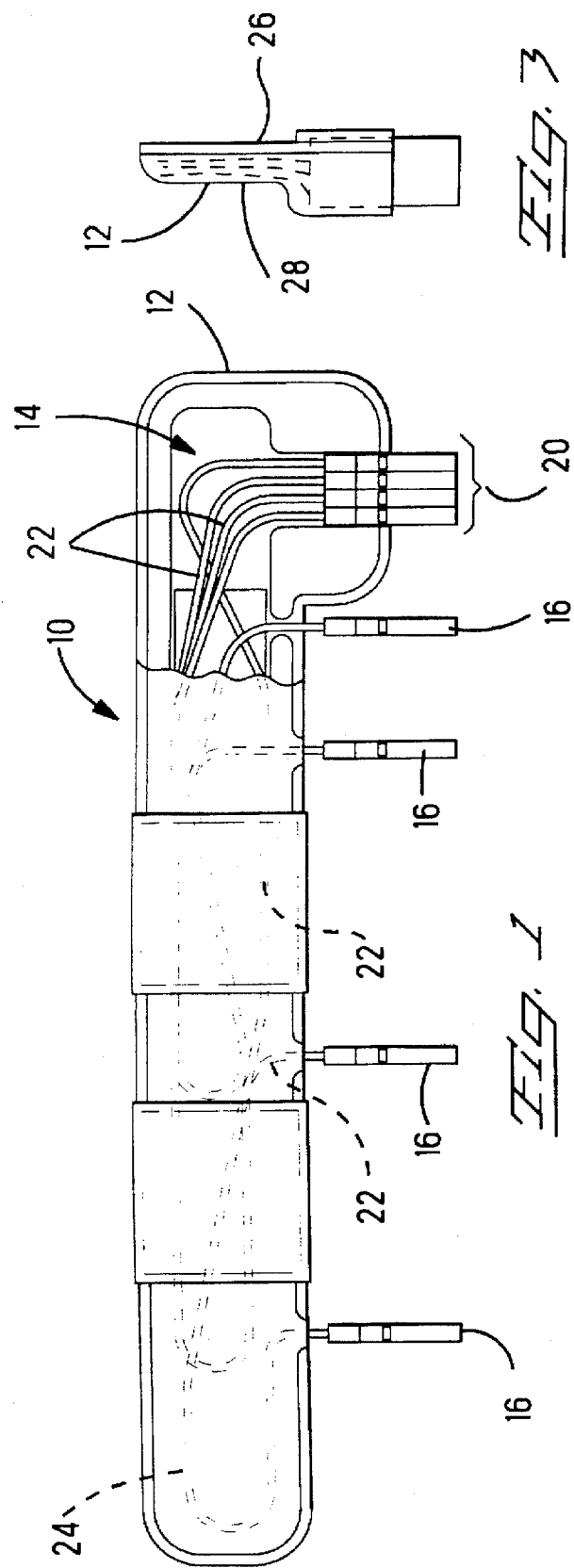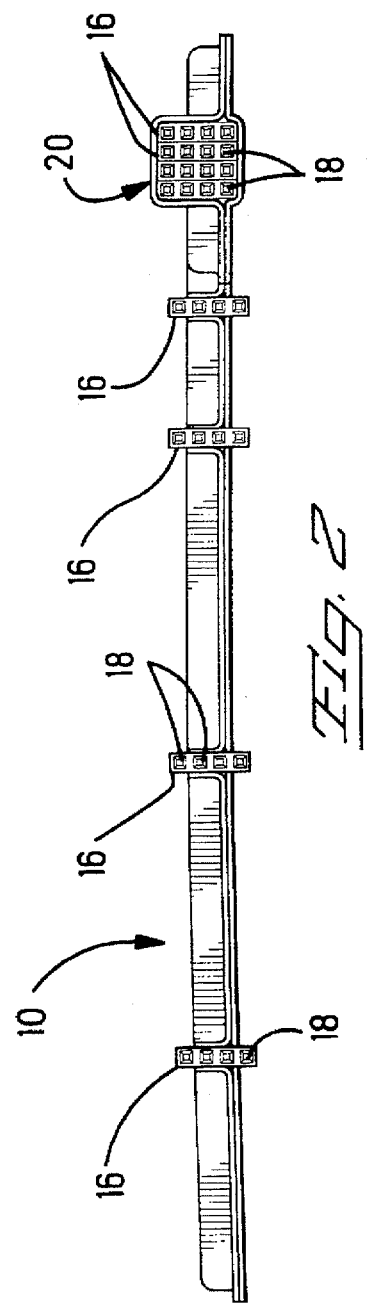

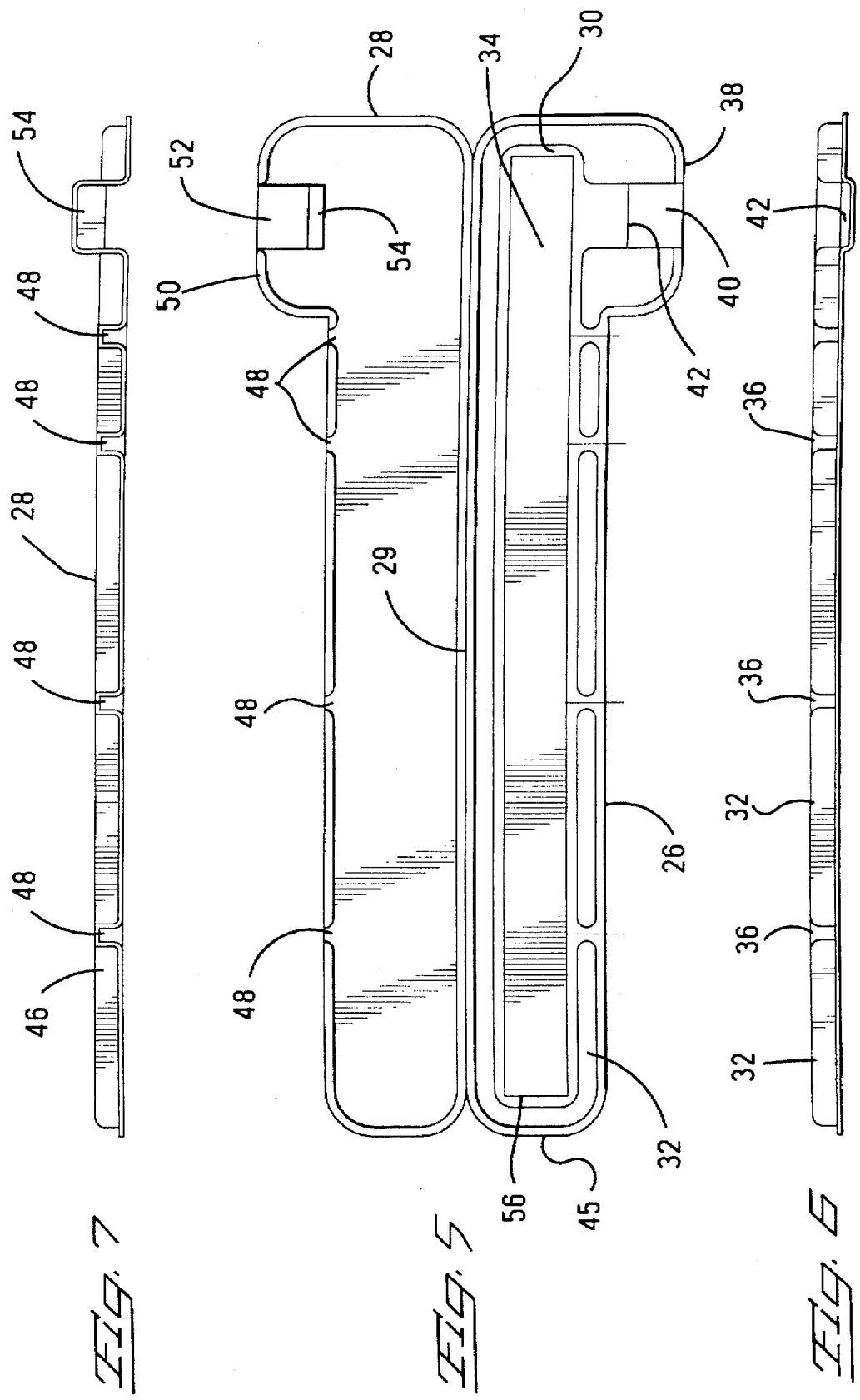

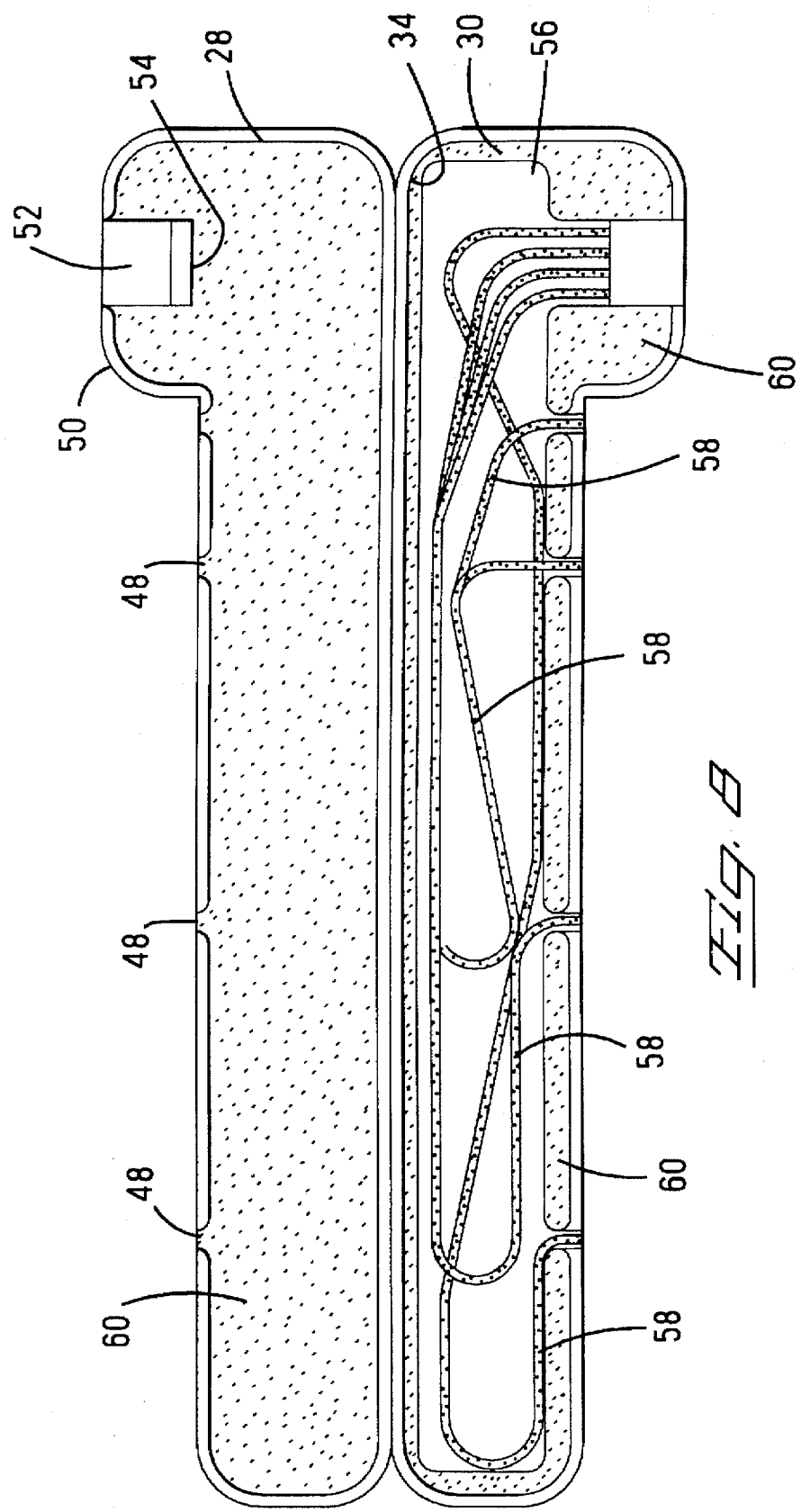

CASE FOR A WIRE HARNESS HAVING COLOR-CODED CABLE ROUTING LINES ON ADHESIVE TAPE

This application claims the benefit of U.S. Provisional Application No. 60/026,767, Filed Sep. 26, 1996.

FIELD OF THE INVENTION

The invention relates to a combination of a case and individual cables in an interior cavity of the case.

BACKGROUND OF THE INVENTION

A case in combination with individual cables of a cable assembly is known from U.S. Pat. No. 5,378,166, and comprises, a case having a double-backed tape in adhesive contact with an interior cavity of the case, individual cables in adhesive contact with the tape, and ends of the cables being terminated with connectors.

SUMMARY OF THE INVENTION

According to the invention, a case in combination with cables suitable for constructing a wire harness, comprises, a tape, cable routing lines on the tape, and individual cables over the cable routing lines, the cables being in adhesive contact with the tape.

An advantage of the invention resides in cable routing lines on a tape for use as a guide to route individual cables directly on a case that will cover the wires.

Another feature of the invention resides in a case in combination with a cable assembly, a tape with adhesive on both sides of the tape in adhesive with an interior cavity of the case, and cable routing lines on the tape, wherein the cable routing lines are of different colors, and individual cables of different colors are over the same colors of the cable routing lines. Another advantage resides in cable routing lines of different colors to avoid incorrect routing of the cables.

The present invention further comprises a method of making a wire harness within a case comprising the steps of: applying a tape having adhesive on both sides of said tape in adhesive contact with the case, routing individual cables along cable routing lines on said tape and in adhesive contact with said tape, and securing to the case connectors with which the cable are terminated, followed by covering an interior of the case to enclose the cables that are in adhesive contact with said tape.

An embodiment of the invention will now be described by way of example with reference to the accompanying drawings according to which:

DESCRIPTION OF THE DRAWINGS

FIG. 1 is a plan view of a case and cable assembly;

FIG. 2 is a front view of the case and cable assembly shown in FIG. 1;

FIG. 3 is an end view of the case and cable assembly shown in FIG. 1;

FIG. 5 is a plan view of the case shown in FIG. 1, in its open position;

FIG. 6 is a front view of the case shown in FIG. 5;

FIG. 7 is a back view of the case shown in FIG. 5; and

FIG. 8 is a view similar to FIG. 5, and illustrating a tape and cable routing lines on the tape.

DESCRIPTION OF THE PREFERRED EMBODIMENT

Figure 4:
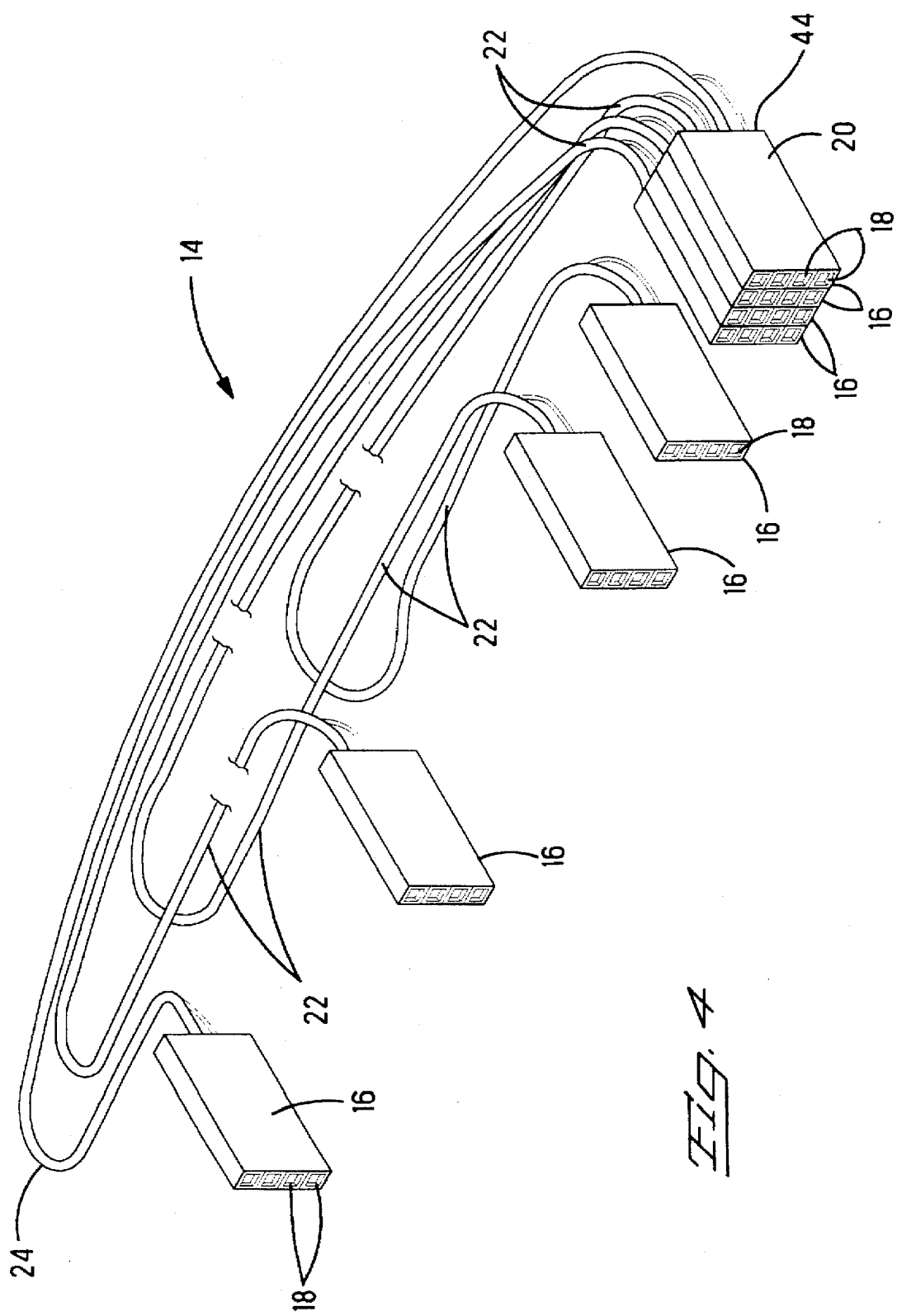
FIG. 4 is an isometric view of the cable assembly shown in FIG. 1.

There is shown in FIGS. 1, 2, and 3 an assembly (10) including a case (12) and a cable assembly (14) contained therein.

As best seen in FIG. 4, the cable assembly (14) includes a first group of four individual four-position connectors (16), each having four receptacle contacts (18) and a second group of four-position connectors (16) arranged in an array (20). The four four-position connectors that form the array (20) are attached to each other by means of a suitable adhesive such as LOCTITE manufactured by LOCTITE Corporation. The cable assembly includes four coaxial cables (22) having one end of each being terminated to a pair of contacts (18) of each of the connectors (16) in the first group of connectors and the other end of each being terminated to a pair of contacts (18) of each connector of the array (20) in the second group. This arrangement can accommodate up to eight coaxial cables, however, any desired number of cables may be accommodated by simply changing the connector configuration. The signals carried by the cables (22) are high speed timing pulses that originate in control equipment that interconnects to the contacts (18) of the connector array (20) and is distributed to other equipment via the connectors (16). The equipment being controlled, in the present example, is various portions of a computer requiring very precise timing. Since the timing of the signal pulses is critical, their propagation time through the cable assembly (14) must be controlled. This is accomplished by cutting each cable (22) to a precise desired length, in the present example all of the cables (22) are of identical length. The length of each cable is substantially greater than the distance between its respective contact (18) in the connector array (20) and the corresponding contact in the connector (16) at the other end, resulting in considerable slack cable that must be looped, as at (24) in FIG. 4. Care must be taken to assure that any loops or bends in the cables (22) have a minimum radius of about three times the diameter of the cable and that there are no sharp bends or kinks that would adversely affect the signal.

As best seen in FIGS. 5, 6, and 7 the case (12) includes a body (26) and a lid (28) which may be hingedly attached to the body along the common edge (29), however, in the present example, the lid and body are separate pieces. The body (26) is of elongated shaped having a floor (30) and a raised wall (32) surrounding the floor thereby defining an interior cavity (34). The cables (22) are disposed within this cavity except for the cable ends terminated to contacts in the connectors (16). There are four openings (36) in the wall (32) large enough to receive and pass through these cable ends so that the connectors (16) will be completely outside of the case (12). Each opening (36) must be large enough to accommodate the number of cable ends terminated to the connector (16), one such cable end to each connector in the present example. One end of the body (26) includes a projection (38) having an opening (40) for receiving the connector array (20). The width of the opening (40) is just slightly larger than the width of the array (20) to proved a snug fit. The floor of the opening (40) is below the level of the floor (30) thereby providing a shoulder (42) at the back of the opening. A rear lower edge (44) of the connector array (20) is in abutting engagement with this shoulder (42), for a purpose that will be explained. A lip (45) extends around the periphery of the body (26) except past the opening (40). The lid (28) has the general elongated shape of the body (26) and includes a wall (46) disposed around its periphery. The wall

(46) has four openings (48) therethrough in registry with the openings (36) of the body (26). The lid (28) includes a projection (50) that conforms in shape to the projection (38) and has an opening (52) that is opposite to, in alignment with, and of the same width as the opening (40), when the lid and body are assembled. The opening (52) terminates in a back wall (54) that is beveled to provide clearance for the cables (22) that are terminated to the connector array (20). The wall (46) is positioned so that its interior surface snugly engages the outer surface of the wall (32) thereby providing a slight interference fit between the two parts. The outer surface of the wall (46) is flush with the outer edge of the lip (44). A strip of adhesive material (56), show in FIG. 5 in phantom lines, is disposed on the floor (30) of the body (26) for holding the cables (22) in place. In the present example double backed tape was used, however, any suitable adhesive may be advantageously used. The lid (28) and body (26), in the present example, are made of any suitable plastic material, however, other suitable materials such as metal may be used.

When assemblying the cable assembly (14) to the case (12) the connector array (20) is secured to the body (26) within the opening (40) by means of any suitable adhesive such as the above mentioned LOCTITE. The cables (22) are then distributed along the floor (30) of the body (26) and pressed against the adhesive strip (56) so that they are held in place by the adhesive. Any slack or excess cable is carefully looped around to avoid kinks and sharp bends. The LOCTITE is then applied to two or three places along portions of the wall (32) that will engage the lid (28), and the lid carefully aligned to the body (26) and pressed in place. The LOCTITE is allowed to cure and then the case and cable assembly is ready for installation onto the backplane of an equipment rack or any other desired equipment. To achieve repairability, the LOCTITE bond must be able to be easily broken by prying lid (28) off of the body (26). This must be considered when selecting an adhesive for holding the lid (28) to the body (26). When installing the assembly (10), the connector array (20) is first mated with its mating connector, not shown, by simply pushing the case (12) so that the force is transmitted to the connector array through the shoulder (42). The other connectors (16) are loosely positioned by their cable ends being guided by the openings (36,48) are somewhat free to be manipulated by hand into mating engagement with their respective mating connectors. With all connectors properly mated the case (12) is then attached to a frame member, not shown, by any suitable means.

While the present example discloses a cable assembly of coaxial cables carrying high speed timing pulses, the teachings of the present invention may be advantageously utilized in applications of other types of cables and wiring harnesses where it is desirable to prevent kinking and tight bends of the individual cables or wires. Additionally, similar connectors are shown at both ends of the cables (22), but it will be understood that any configuration or combination of different connectors may be utilized in the practice of the present invention including individual connectors in place of the array (20), and cable ends extending through any of the openings without connectors terminated thereto.

An important advantage of the present invention is that the individual cables are not tied to the equipment frame and so cannot be subjected to sharp bends or kinking during installation. The case positions the terminated ends of the cables for convenient mating to their respective mating connectors and completely encloses the cables and protects them from possible damage by adjacent equipment. The cost to manufacture the case (12), assemble the cables therein, and install the assembly into the equipment is less than the alternative and provides the additional benefit of increased reliability of the operating equipment.

The tape (56) comprising the adhesive material or adhesive strip, described above, is printed with lines that comprises wire routing lines (58), FIG. 7, with each of the lines (58) defining a route for a corresponding individual cable (22). The tape (56) is then used as a wire routing guide for the individual cables (22), particularly during the manufacture of a wire harness directly on the case (12). In use, the tape (56) is applied in adhesive contact with the floor (50) of the body (26) of the case (12). The individual cables (22) are routed along and over corresponding wire routing lines (58), the individual cables (22) adhesively attaching to the tape (56). The tape (56) and the wire routing lines (58) determine the length of each cable (22) to eliminate the chance of the cable (22) being too short or too long.

After the cables (22) have been routed along the wire routing lines (58), and are in adhesive contact with the tape (56), ends of the cables (22) are terminated by the connectors (16), according to a known practice, for example, according to the practice as described in U.S. Pat. No. 3,885,287, incorporated herein by reference. The connectors (16) are then secured to the case (12), for example, to form the array (20), as described above. Additional connectors (16) are located along openings (36) through the case (12) and through which openings (36) ends of the cables (22) extend for connection to the respective connectors (16).

A wire harness can comprise individual cables (22) of different colors. A further advantage of the tape (56) resides in the cable routing lines (58) being printed in different colors corresponding to different colors of the individual cables (22). By routing cables (22) along and over wire routing lines (58) of the same colors as the colors of the cables (22), incorrect routing of the cables (22) is avoided. A further feature of the invention resides in a conducting film (60) in the form of a paint, ink, metal particles that are vapor deposited or sputtered in place, to comprise electrical shielding covering the interior cavity of the case (12). The tape (56) is applied in adhesive contact with said conducting film (60) on the interior cavity of the case (12).

An advantage of the invention resides in cable routing lines on a tape for use as a guide to route individual cables directly on a case that will cover the wires.

Another advantage resides in cable routing lines of different colors to avoid incorrect routing of the cables.

What is claimed is:

1. A case in combination with a cable assembly having individual cables, each of which is a precise desired length, wherein the ends of each of said cables are positioned by said case for interconnection with other electrical components outside of said case, and further comprising:

a tape with adhesive on both sides of the tape in adhesive contact with an interior of said case, cable routing lines on said tape, the cable routing lines indicating the desired location for said cables along an interior cavity of the case, said cables being routed along said routing lines and in adhesive contact with said tape, and said ends of each of said cables being connected to corresponding connectors.

2. A case in combination with a cable assembly as recited in claim 1 wherein, the cable routing lines are of different colors, said cables are of different colors, and the cables of different colors are over the same colors of the cable routing lines.

3. A case in combination with a cable assembly as recited in claim 1 wherein, said interior comprises a conducting film providing shielding, and said tape is in adhesive contact with said conducting film.

4. A case in combination with a cable assembly as recited in claim 1 wherein, said interior comprises a conducting film providing shielding, and said case is in adhesive contact with said conducting film, the cable routing lines are of different colors, said cables are of different colors, and said cables of different colors are over the same colors of the cable routing lines.

5. A method of making a wire harness within a case comprising the steps of:

applying a tape with adhesive on both sides of said tape in adhesive contact with a floor, routing individual cables along cable routing lines on said tape and in adhesive contact with said tape, and securing to the case connectors to which the cables are terminated, followed by covering an interior cavity of said case to enclose the cables that are in adhesive contact with said tape.

6. A method as recited in claim 5, and further comprising the step of:

applying a conducting film on said floor to comprise electrical shielding prior to the step of applying said tape in adhesive contact with said floor.

* * * * *